March 20, 1951
J. W. HAMILTON
2,545,732
COMBUSTION CONTROL
Filed March 2, 1949
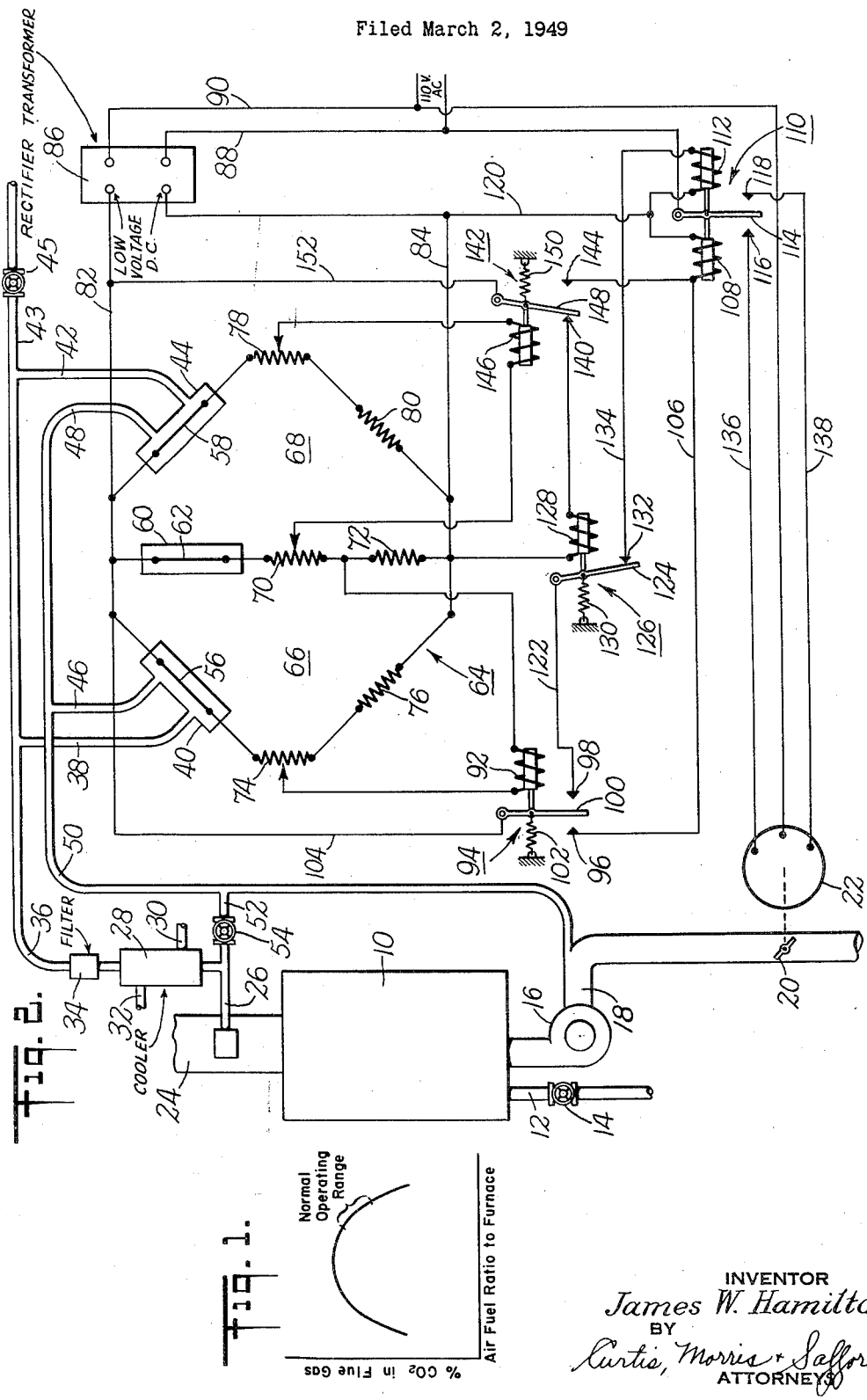
INVENTOR
James W. Hamilton
BY
Curtis, Morris + Safford
ATTORNEYS Patented Mar. 20, 1951

2,545,732

UNITED STATES PATENT OFFICE 2,545,732

COMBUSTION CONTROL

James W. Hamilton, Valley Stream, N. Y.

Application March 2, 1949, Serial No. 79,182

4 Claims. (Cl. 236—15)

This invention relates to combustion control and more particularly to a novel method and apparatus for so controlling the ratio of air flow to fuel flow to a combustion chamber as to produce a desired carbon dioxide content in the combustion products leaving the chamber and thereby increase the combustion efficiency.

It is well known that the carbon dioxide content of combustion products leaving a combustion chamber is a function of the relative amounts of air and fuel fed to the chamber and that the carbon dioxide content of, for example, the flue gas leaving a furnace or boiler is an index of the efficiency of the combustion occurring within the furnace. However, so far as I am aware, no one has previously proposed a fully automatic and wholly practical method of using the carbon dioxide content of flue gas as a control variable to control air-fuel ratio to a furnace in such manner as to obtain optimum combustion efficiency.

The previous failure to achieve adequate control of the air-fuel ratio in response to flue gas composition may be due at least in part to the failure to solve satisfactorily a special problem that arises because of the nature of the relationship between carbon dioxide content of the flue gas and the air-fuel ratio. This relationship is diagrammatically illustrated in Figure 1 of the accompanying drawing, which is a graph of the percentage of carbon dioxide in the flue gas plotted against the air-fuel flow ratio to the furnace. Referring to Figure 1, it is evident that as the air-fuel ratio increases the proportion of carbon dioxide in the flue gas increases, passes through a maximum, and then decreases again. From this chart it is evident that if the carbon dioxide content of the flue gas is measured and found to be below its maximum value the relatively low value of the carbon dioxide content may be due either to an inadequate air supply or to an excessive air supply. Hence, in order to achieve practical control of the carbon dioxide content at a point near the optimum carbon dioxide content, it is necessary to have some method of determining whether a measured departure from the maximum carbon dioxide concentration should be corrected by an increase or by a decrease of the air-fuel ratio.

It is an object of the present invention to provide an improved method and apparatus for automatically controlling the air-fuel flow ratio to a combustion chamber in response to the composition of the combustion products leaving the combustion chamber to maintain the carbon dioxide content of the exit gases at an optimum value and thereby improve the combustion efficiency within the chamber. It is another object of the invention to provide apparatus for rapidly and continuously measuring the carbon dioxide content of the flue gas leaving a furnace and automatically adjusting the air-fuel ratio to the furnace to maintain the carbon-dioxide content of the exit gases at a desired value. It is still another object of the invention to provide apparatus of this character that is capable of discriminating between the departures of the carbon dioxide content from the desired value that require an increase in the air-fuel ratio for correction and those that require a decrease of the air-fuel ratio for correction. Other objects of the invention will be in part obvious and in part pointed out hereinafter.

The many objects and advantages of the present invention may best be understood by reference to the accompanying drawing which illustrates diagrammatically a control system incorporating a preferred embodiment of the present apparatus invention and capable of being used to carry out the method of the invention. In the drawing:

Figure 1, as previously described, is a chart indicating the nature of the relationship between the air-fuel flow ratio to a furnace and the carbon dioxide content of the flue gas leaving the furnace; and, Figure 2 is a diagrammatic representation of a preferred embodiment of the invention.

In one of its broader aspects, the method of the present invention comprises measuring the thermal conductivity of the combustion products, e. g. flue gas, from a combustion chamber, e. g. a furnace, as a measure of the carbon dioxide content of the flue gas, measuring the thermal conductivity of a standard gas having a predetermined selected carbon dioxide content, comparing the thermal conductivities of the flue gas and the standard gas, and regulating the air-fuel flow ratio to the furnace in accordance with the relation between the thermal conductivities of the flue gas and standard gas to increase the air-fuel ratio when the carbon dioxide content of the flue gas is above that of the standard gas and to decrease the air-fuel ratio when the carbon dioxide content of the flue gas is below that of the standard gas. The thermal conductivity of the flue gas can be readily measured in a continuous manner and provides an unusually rapid and sensitive measuring method for use in automatic control of the carbon dioxide content of the flue gas. As indicated in Figure 1, the present method and apparatus normally operates within a range such that the air-fuel ratio is somewhat greater than that required to produce a maximum carbon dioxide content in the flue gas.

As stated above, it is possible under certain conditions, as for example when an unpredictable increase in fuel flow occurs, for a low carbon dioxide content to be due to a deficiency of air and in such cases it is desirable to provide some method of effectively reversing the normal operation of the control apparatus, i. e. causing a low carbon dioxide concentration to produce an increase rather than a decrease in the air-fuel ratio. Where the low carbon dioxide content of the flue gas is due to a deficiency of air the flue gas normally contains combustible material such as carbon monoxide and/or hydrogen. In accordance with one embodiment of the present method, the presence of such combustible material is detected by a suitable detecting means which forms part of a secondary controller that is adapted to take over the control operation when combustible components are present in the flue gas and to increase continuously the air-fuel ratio so long as combustible components are present in the flue gas, notwithstanding the fact that the primary controller of the apparatus is calling for decrease in the air-fuel ratio. One way in which the present method can be carried out will be explained and illustrated in connection with the accompanying drawing.

Referring to the drawing and more particularly to Figure 2 thereof, the numeral 10 designates a furnace which is supplied with fuel through a pipe 12 containing a regulating valve 14 and is supplied with air by a blower 16. Air for combustion is supplied to the blower 16 through a conduit 18 containing a regulating valve 20 which may be of the conventional "butterfly" type and which is operated by a reversible motor 22 to vary the air supply to the furnace 10. The combustion products leave the furnace 10 through a conduit 24 and pass to a stack (not shown).

Flue gas from the conduit 24 is continuously withdrawn through a pipe 26 and flows to a cooler 28 wherein it is cooled. Cooling water is supplied to the cooler 28 through a pipe 30 and withdrawn through a pipe 32. From the cooler 28 flue gas flows through a filter 34, which contains a suitable filtering material such as glass wool, and then through pipe 36 and branch pipe 38 to and through a thermal conductivity cell 40. Flue gas from the pipe 36 is also supplied through a branch pipe 42 to a detector cell 44. The gas flowing through pipe 42 to cell 44 is continuously mixed with air supplied from a branch pipe 43 containing a regulating valve 45. From the cells 40 and 44 flue gas flows through the branch pipes 46 and 48 and pipe 50 back to the conduit 18 and suction side of blower 16. Interconnecting the pipes 26 and 50 there is a by-pass 52 containing a normally closed valve 54. Thus a continuous flue gas sample is effectively drawn by blower 16 from the conduit 24 through cells 40 and 44.

The thermal conductivity cell 40 contains an electrical resistance element 56 and the detector cell 44 contains a similar resistance element 58. Located between the cells 40 and 44 in Figure 1 is a second thermal conductivity cell 60 which is provided with a resistance element 62 and is filled with a standard gas containing a predetermined constant concentration of carbon dioxide. The cells 40, 44 and 60 are of conventional and well-known construction. The elements 56, 58 and 62 are preferably sections of platinum wire.

The resistance elements 56, 58 and 62 are incorporated in an electrical bridge generally designated 64 and comprising a first balancing circuit generally designated 66 and a second balancing circuit generally designated 68. The element 62 is connected in series with two resistors 70 and 72 and together with these resistors forms part of each of the balancing circuits 66 and 68. The balancing circuit 66 includes in addition to element 62 and resistors 70 and 72, the element 56 of cell 40, a variable resistor 74, and a fixed resistor 76. The balancing circuit 68 includes in addition to element 62 and resistors 70 and 72, the element 58 of cell 44, variable resistor 78 and fixed resistor 80. The balancing circuits are energized through conductors 82 and 84 which connect the bridge to a rectifier-transformer 86 which is in turn energized from a suitable 110-volt alternating current source through the conductors 88 and 90. The rectifier-transformer 86 operates to supply direct current at a reduced potential to the bridge 64.

The adjacent ends of resistors 70 and 72 are connected with the adjustable tap of resistor 74 through the coil 92 of a relay generally designated 94 and comprising a pair of contacts 96 and 98 and a switch arm 100 biased away from the coil 92 by a spring 102. The resistor 74 is so adjusted that when the carbon dioxide content within cell 40 is less than that within cell 60, coil 92 is energized to an extent sufficient to draw switch arm 100 against contact 98 and conversely when the carbon dioxide content in cell 40 is above that in cell 60, coil 92 is deenergized to an extent sufficient to permit spring 102 to draw switch arm 100 against contact 96. The switch arm 100 is energized from one side of the rectifier-transformer 86 through conductors 82 and 104.

The contact 96 is connected by a conductor 106 to one end of a coil 108 of a relay generally designated 110 and including a second coil 112, a switch arm 114 and the contacts 116 and 118. The adjacent ends of coils 108 and 112 are connected by a conductor 120 with the transformer-rectifier 86.

The contact 98 is connected by a conductor 122 to the switch arm 124 of a relay 126, which includes a coil 128, a spring 130 biasing the switch arm 124 away from coil 128 and a contact 132 which is connected by a conductor 134 to one end of the coil 112 of relay 110. The relay 126 is normally closed and hence the relay 94 normally operates to energize one or the other of coils 108 and 112 of relay 110 to cause switch arm 114 to make contact with either contact 116 or 118 depending upon whether the measured carbon dioxide content is high or low respectively.

The contacts 116 and 118 are connected by the conductors 136 and 138 respectively with the reversible motor 22 and the center tap of the reversible motor 22 is connected to the conductor 90 which, as previously described, is connected to one side of the main power supply. The other side of the power supply, conductor 88, is connected to the switch arm 114 of relay 110. Thus the control apparatus so far described comprises a primary controller which causes reversible motor 22 to be operated in one direction or the other to regulate valve 20 and thereby adjust the air supply in accordance with variations in the carbon dioxide content of the flue gas.

As previously described, it is desirable that this normal control operation of the primary controller be arrested or interrupted and effectively reversed when a reduction in carbon dioxide content of the flue gas occurs that is due to a deficiency of air and the apparatus comprising a secondary controller for accomplishing this function will now be described. One end of the coil 128 of relay 126 is connected to the adjacent ends of resistors 72 and 80, whereas the other end of coil 128 is connected to the contact 140 of a relay 142. The relay 142 includes, in addition to contact 140, a second contact 144, a coil 146 and a switch arm 148 that is biased away from contact 140 by a spring 150. The switch arm 148 is connected by a conductor 152 to conductor 82 through which it is energized.

The ends of coil 146 of relay 142 are connected to the adjustable taps of the variable resistors 70 and 78. The resistors 70 and 78 are so adjusted that relay 142 is normally closed and opens only when the air-fuel ratio drops to the point where the flue gas contains combustible components. When such a condition occurs the air-flue gas mixture within the cell 44 burns completely and the element 58 is heated up to a sufficient extent to increase substantially its resistance. This increase in resistance of element 58 unbalances bridge 68 to actuate relays 126, 142 and 110 in such manner as to interrupt the operation of the primary controller and cause the motor 22 to turn valve 20 in a closing direction. The balancing circuit 68 is so biased that changes in resistance of element 58 due to changes in the carbon dioxide content of the flue gas do not unbalance the circuit 68 in a direction to cause the foregoing operations to take place.

The operation of the system described should be largely apparent from the foregoing description. A continuous flue gas sample is cooled, filtered and passed through the cells 40 and 44. The resistances of the resistors of the bridge circuit are so chosen that the elements 56 and 62 of cells 40 and 60 operate at a temperature of about 200° F. and the element 58 of cell 44 operates at a temperature of about 800° F. As the carbon dioxide content of the flue gas flowing through the cell 40 varies, its thermal conductivity varies and thus the heat loss from element 56 varies. The resulting temperature variation of element 56 produces a change in its electrical resistance.

The cell 60 contains a gas having a selected constant carbon dioxide content and hence the heat loss from element 62 and its electrical resistance normally remains substantially constant. If desired, a fixed resistance can be substituted for the cell 60 and its element 62. However, the use of a standard cell is desirable because of the possibility of variations in factors such as ambient temperature which affects the standard cell 60 and the measuring cell 40 in the same way.

The elements 56 and 62 are connected in the balancing circuit 66 in such manner that when the carbon dioxide content of the flue gas is below the desired value the coil 92 is energized to draw switch arm 100 against contact 98, thereby energizing coil 112 of relay 110 to cause reversible motor 22 to close valve 20. Conversely, when the carbon dioxide content of the gas in cell 40 is above the desired value, contact 96 of relay 94 is made, thus energizing coil 108 of relay 110 and thereby causing motor 22 to open valve 20 and increase the air-fuel ratio to the furnace. The cells 40 and 60, the balancing circuit 66 and their associated relays comprise a primary controller for maintaining the carbon dioxide content of the flue gas at a desired value or control point. The control point of the primary controller need not be the same as the concentration of carobn dioxide in cell 60, since these two values may be made to differ by a fixed amount by appropriate selection of resistance values in the balancing circuit 66.

If a deficiency of air occurs and the flue gas contains combustible material, the air in the mixture of flue gas and air passing through the cell 44 will cause the combustible components to burn. The hot platinum wire element 58 serves to catalyze combustion of the combustible components and the heat of combustion raises the temperature and electrical resistance of element 58. This increase in resistance of element 58 unbalances the balancing circuit 68 thus deenergizing relays 142 and 126. Contact 144 of relay 142 is made with the result that coil 108 of relay 110 is energized to cause motor 22 to open valve 20 and increase the air-fuel ratio. Since the relay 126 is de-energized during this period, the coil 112 of relay 110, which causes motor 22 to operate in a valve closing direction, cannot be energized until the air-fuel ratio has increased to an extent sufficient to eliminate combustible components from the flue gas. Thus the detector cell 44 and balancing circuit 68 comprise a secondary controller which dominates the control operation and applies a suitable correction when a low carbon dioxide content is due to an inadequate supply of air to the furnace.

From the foregoing description it should be apparent that the present invention provides a simple and effective method and apparatus for controlling the air-fuel ratio to a furnace in response to variations in the carbon dioxide content of the flue gas. The thermal conductivity measuring method is simple and accurate and when incorporated in the present control apparatus provides an effective control for improving combustion efficiency. It will, of course, be understood that the foregoing description is illustrative only and that numerous modifications of the described embodiment may be made within the scope of the invention. Thus it is evident that the air-fuel ratio may be varied by regulating fuel flow rather than air flow. The method and apparatus are broadly applicable to the control of combustion whether it occurs in a furnace or in another type of combustion chamber. Other modifications within the scope of the invention will be apparent to those skilled in the art.

I claim:

1. In apparatus for controlling the ratio of air flow to fuel flow to a combustion chamber to maintain the carbon dioxide content of the combustion products leaving said chamber at a desired value for efficient combustion, in combination, regulating means for regulating said air-fuel ratio, first thermal conductivity responsive means having a first electrical resistance element, the resistance of which varies as a function of the thermal conductivity of the atmosphere surrounding said element, means for passing a continuous sample of said combustion products over said element to cause the resistance of said element to vary as a function of the carbon dioxide content of said combustion products, a second thermal conductivity responsive means including a second electrical resistance element having a resistance which varies as a function of the thermal conductivity of the atmosphere in contact therewith, said second thermal conductivity means including a standard gas having a predetermined carbon dioxide content maintained in contact with said second element, an electrical bridge circuit incorporating said first and second resistance elements and means interconnecting said electrical bridge and said regulating means, said interconnecting means being responsive to unbalance of said bridge to operate said regulating means to cause said regulating means to increase said air-fuel ratio when the carbon dioxide content of said combustion products is higher than said desired value and decrease said air-fuel ratio when the carbon dioxide content of said combustion products is lower than said desired value and detecting means for detecting the presence of combustible components in said combustion products, said detecting means being connected into said bridge and being operative, when the air supply to the combustion chamber is insufficient to produce complete combustion, to interrupt the operation of said interconnecting means and cause said regulating means to increase said air-fuel ratio irrespective of the condition of said first thermal conductivity means.

2. In apparatus for controlling the ratio of air flow to fuel flow to a combustion chamber to maintain the carbon dioxide content of the combustion products leaving said combustion chamber at a desired value for efficient combustion, in combination, regulating means for regulating said air-fuel ratio, first thermal conductivity responsive means having a first electrical resistance element, the resistance of which varies as a function of the thermal conductivity of the atmosphere surrounding said element, means for passing a continuous sample of said combustion products over said element to cause the resistance of said element to vary a function of the carbon dioxide content of said combustion products, second thermal conductivity responsive means including a second electrical resistance element having a resistance which varies as a function of the thermal conductivity of the atmosphere in contact therewith, said second thermal conductivity means including a standard gas having a predetermined carbon dioxide content maintained in contact with said second element, an electrical bridge circuit incorporating said first and second resistance elements and means interconnecting said electrical bridge and said regulating means, said interconnecting means being responsive to the unbalance of said bridge to operate said regulating means to cause said regulating means to increase said air-fuel ratio when the carbon dioxide content of said combustion products is higher than said desired value and decrease said air-fuel ratio when the carbon dioxide content of said combustion products is lower than said desired value, detecting means including a third resistance element, means for continuously supplying a mixture of said combustion products and air to said detecting means to cause a mixture of air and flue gas to pass continuously over said third resistance element whereby when said combustion products contains combustible components said components are burned to increase the temperature of said third resistance element, said third element being connected into said bridge circuit to interrupt the operation of said interconnecting means when the air supply to said combustion chamber is insufficient to cause complete combustion and to cause said regulating means to increase the air supply to said combustion chamber irrespective of the condition of said first thermal conductivity means.

3. In apparatus for controlling the ratio of air flow to fuel flow to a combustion chamber to maintain the carbon dioxide content of the combustion products leaving said chamber at a desired value for efficient combustion, in combination, regulating means for regulating said air-fuel ratio, a first, second and third cell containing respectively a first, second and third electrical resistance element, means for supplying said combustion products continuously to said first and third cells to cause a stream of said combustion products to pass continuously over said first and third elements, said second cell containing a standard gas having a predetermined constant carbon dioxide content in contact with said second resistance element, means for mixing air with the combustion products supplied to said third cell to cause said third element to be heated to a relatively higher temperature when said combustion products contain combustible components, an electrical bridge incorporating said first, second and third resistance elements and including a first circuit containing said first and second elements and a second circuit containing said second and third elements, means responsive to the unbalance of said first circuit for operating said regulating means to increase said air-fuel ratio when the carbon dioxide content of said combustion products is higher than said desired value and decrease the air-fuel ratio when the carbon dioxide content of said combustion products is lower than said desired value and means responsive to the unbalance of said second circuit for interrupting the operation of said first circuit responsive means to cause said regulating means to increase said air-fuel ratio whenever said combustion products contain combustible components and irrespective of the condition of said first circuit.

4. In apparatus for controlling the ratio of air flow to fuel flow to a combustion chamber to maintain the carbon dioxide content of the combustion products leaving said chamber at a desired value for efficient combustion, in combination an air supply conduit supplying air to said furnace, valve means in said air supply conduit for regulating the flow of air therethrough, a reversible motor operating said valve means, a first, second and third cell containing respectively a first, second and third electrical resistance, said second cell containing a standard gas having a predetermined constant carbon dioxide content in contact with said second element, means for supplying combustion products to said first and third cells to cause a continuous stream of said combustion products to pass over said first and third elements, means for mixing air with the combustion products supplied to said third cell to cause the temperature of said third element to be increased to a relatively high value when said combustion products contain combustible components, an electrical bridge incorporating said first, second and third elements and including a first balancing circuit containing said first and second elements and a second balancing circuit containing said second and third elements, first relay means connected to said first circuit and said reversible motor and responsive to unbalance of said first circuit to reverse the operation of said reversible motor when the carbon dioxide content of said flue gas goes above or below said desired value whereby the air-fuel ratio is increased when the carbon dioxide content of said combustion products is higher than said desired value and decreased when the carbon dioxide content is below said desired value and second relay means connected to said second balancing circuit and to said first relay means to interrupt the operation of said first relay means when the resistance and temperature of said third element change due to the presence of combustible components in said combustion products and to energize said reversible motor in a valve-opening direction to increase the air fuel ratio to said furnace.

JAMES W. HAMILTON.

REFERENCES CITED

The following references are of record in the file of this patent:

UNITED STATES PATENTS

| Number | Name | Date |
|---|---|---|
| 1,645,350 | Reineke | Oct. 11, 1927 |
| 1,681,047 | Porter | Aug. 14, 1928 |
| 2,052,375 | Wunsch et. al. | Aug. 25, 1936 |